United States Patent
Gupta et al.

(10) Patent No.: US 10,949,239 B2
(45) Date of Patent: Mar. 16, 2021

(54) APPLICATION DEPLOYMENT IN A CONTAINER MANAGEMENT SYSTEM

(71) Applicant: Hewlett Packard Enterprise Development LP, Houston, TX (US)

(72) Inventors: Amit Kumar Gupta, Bangalore (IN); Ajay Vishwanath Bhande, Bangalore (IN); Pruthvi Panyam Nataraj, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 74 days.

(21) Appl. No.: 16/220,284

(22) Filed: Dec. 14, 2018

(65) Prior Publication Data

US 2020/0192690 A1    Jun. 18, 2020

(51) Int. Cl.
| | |
|---|---|
| *G06F 9/455* | (2018.01) |
| *G06F 8/60* | (2018.01) |
| *G06F 9/4401* | (2018.01) |
| *G06F 9/50* | (2006.01) |
| *H04L 29/08* | (2006.01) |

(52) U.S. Cl.
CPC ............ *G06F 9/45558* (2013.01); *G06F 8/60* (2013.01); *G06F 9/4418* (2013.01); *G06F 9/5072* (2013.01); *H04L 67/34* (2013.01); *G06F 2009/4557* (2013.01); *G06F 2009/45562* (2013.01); *G06F 2009/45575* (2013.01); *G06F 2009/45587* (2013.01)

(58) Field of Classification Search
CPC combination set(s) only.
See application file for complete search history.

(56) References Cited

U.S. PATENT DOCUMENTS

| | | | |
|---|---|---|---|
| 2005/0038933 A1 | 2/2005 | Himmel et al. | |
| 2005/0255833 A1* | 11/2005 | Bar-Or | H04W 4/12 455/412.1 |
| 2007/0106739 A1* | 5/2007 | Clark | H04L 51/38 709/206 |
| 2008/0201414 A1* | 8/2008 | Amir Husain | G06F 9/5077 709/203 |
| 2009/0217072 A1* | 8/2009 | Gebhart | G06F 1/3203 713/330 |
| 2011/0055602 A1 | 3/2011 | Kamay et al. | |
| 2012/0227038 A1 | 9/2012 | Hunt et al. | |
| 2012/0331406 A1* | 12/2012 | Baird | G06F 16/95 715/760 |

(Continued)

OTHER PUBLICATIONS

Is there a Way to Hibernate a Docker Container, (Web Page), Retrieved Sep. 14, 2018, 4 Pgs.

*Primary Examiner* — Tuan C Dao
(74) *Attorney, Agent, or Firm* — Brooks, Cameron & Huebsch, PLLC

(57) ABSTRACT

A container management system and device that includes a hibernator deployment to determine a semantic defined for applications generated to perform deployments in the container management system, determine whether the applications are active during a corresponding time period included within the semantic, and transfer the applications from an active state to an inactive state in response to the application not being inactive during the corresponding time period included within the semantic defined for the application.

18 Claims, 7 Drawing Sheets

(56) References Cited

U.S. PATENT DOCUMENTS

| | | | |
|---|---|---|---|
| 2013/0297668 A1* | 11/2013 | McGrath | G06F 9/485 709/201 |
| 2015/0058521 A1 | 2/2015 | Armstrong et al. | |
| 2015/0120928 A1 | 4/2015 | Gummaraju et al. | |
| 2018/0227369 A1* | 8/2018 | DuCray | H04L 12/403 |
| 2018/0309747 A1* | 10/2018 | Sweet | H04L 63/20 |

* cited by examiner

APPLICATION DEPLOYMENT IN A CONTAINER MANAGEMENT SYSTEM

BACKGROUND

For enterprise data storage, clustering can refer to the physical connection of independent compute nodes (servers) and a controlling function for controlling management of nodes of the cluster. The controlling function can distribute workloads to each node, manage the transfer of workloads between nodes, or both. Such clustering can include a shared storage system, along with a mechanism to duplicate the data in the storage system that is directly attached to each node that may be used. Common storage clustering applications provide failover capabilities for critical processes and enable load balancing for high-performance processes. Operation containerization can be an operating system (OS)-level virtualization method used to deploy and run distributed operations without launching an entire virtual machine (VM) for each operation. Multiple isolated operations run on a single host and access the same OS kernel. For example, Container Linux (formerly CoreOS Linux) may be one of the first container operating systems bunt for containers. Software containers are a form of OS virtualization where the running container includes minimum operating system resources, memory, and services to run an operation.

DETAILED DESCRIPTION

Figure 1:
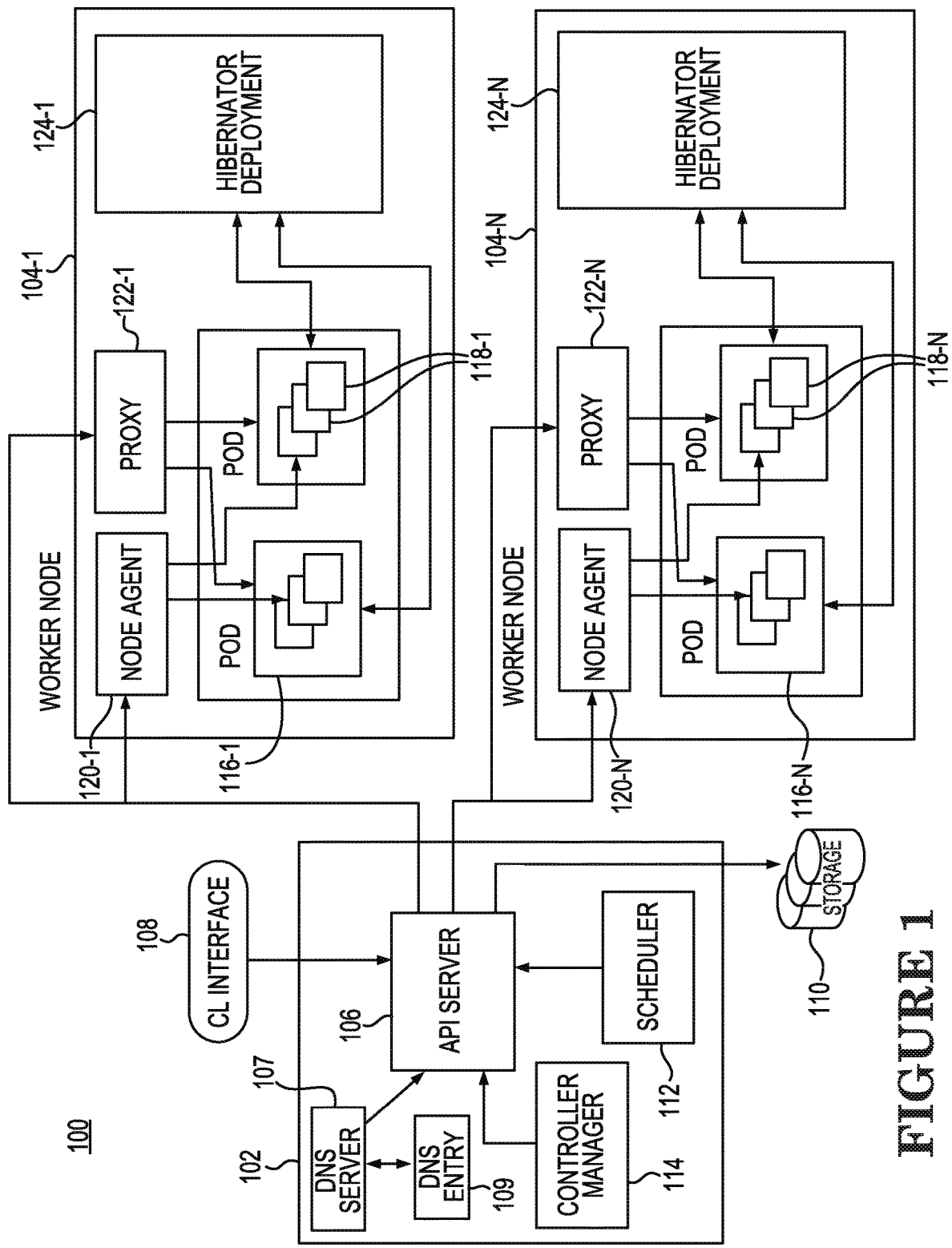
FIG. 1 is a schematic diagram of an example container management system consistent with the present disclosure.

A data center operating system, such as a Kubernetes container management system, for example, can include a free and open source container management system that provides mechanisms for deploying, maintaining and scaling containerized management systems. Such systems are intended to provide a platform for automating deployment, scaling, and operation of applications across dusters of hosts and utilize a command-line interface (CLI) that allows for running commands against clusters within the container management system. Commands can be defined that can be used to construct the CLI to manage a cluster, and to gather information from the commands so that cluster resources or services may be created, grouped, updated, and/or deleted. In this way, a container management system defines a set of building blocks or primitives that collectively provide mechanisms, such as the CU, that deploy, maintain, and scale operations.

The container management system is extensible to meet different workloads. This extensibility is provided in large part by an application programming interface (API), which is used by internal components as well as extensions and containers that run on the container management system.

The basic scheduling unit of a container management system is a pod, which adds a higher level of abstraction by grouping containerized components. A pod consists of one or more containers that are to be co-located on the host machine and that can share resources. Each pod in the container management system is assigned a unique IP address within a cluster of pods, which allows the applications to use ports while minimizing the risk of conflict. A pod can define a volume, such as a local disk directory or a network disk, and can expose it to the containers in the pod. Pods can be managed manually through the API, or their management can be delegated to a controller.

Further, a container management system may include a portable, extensible open-source platform for managing containerized workloads and services to provide a container-centric management environment and orchestrate computing, networking, and storage infrastructure on behalf of user workloads. A container management system may include assigning a unique IP to each container in a container management system that is addressable by any other container within a cluster of hosts. AH operations and communications between components, and external user commands, are made using representational state transfer (REST) commands transmitted via an application programming interface (API). An API server receives the transmitted REST commands. Consequently, each object in the container management system platform is treated as an API object and has a corresponding entry for the API. API objects are used to describe a state of a duster, including the applications or other workloads that are to run, what container images they use, the number of replicas, status of nodes, what network and disk resources to make available, and so forth. The state is set by creating objects using the API, typically via the command-line interface. The API may also be used directly to interact with the cluster and set or modify a desired state.

A container management cluster deploys applications across nodes of the cluster based on the scheduling policies of the cluster. While there are large numbers of applications that are being deployed in a cluster of pods, some applications may only run periodically (e.g., daily, weekly) based on data availability. However, during periods of non-use the applications continue to consume resources (e.g., CPU, memory, etc.), which can result in inefficient resource utilization and increased resource costs, along with reduced system performance and increased scaling issues in environments with fixed resources.

Therefore, the present disclosure relates to use of a hibernator deployment implemented as a single or multiple microservices that monitors the applications on a cluster of a container management system to determine those applications that include a "hibernate-when-inactive" semantic defined for the application and placing the application in a hibernated or inactive state when the hibernator deployment determines that the application is not receiving data packets on the service port for a predetermined period of time, such as ten (10) minutes for example. While the application is placed in the hibernated state, the hibernator deployment diverts traffic coming on the hibernated application's service port to the hibernator deployment. The hibernator deployment monitors the service port on behalf of the hibernated application and when the hibernator deployment receives an incoming packet on the hibernated application's port, the hibernator deployment caches the incoming packet or packets and removes the hibernated application from the hibernated state. Once the hibernated application is removed from the hibernated state, traffic flow for the application is resumed and the cached data packets are relayed to the application for resumed processing of the application.

The figures herein follow a numbering convention in which the first digit corresponds to the drawing figure number and the remaining digits identify an element or component in the drawing. For example, reference numeral 216 refers to element "216" in FIG. 2 and an analogous element may be identified by reference numeral 316 in FIG. 3B. Analogous elements within a Figure may be referenced with a hyphen and extra numeral or letter. See, for example, elements 120-1, and 112-N in FIG. 1. Such analogous elements may be generally referenced without the hyphen and extra numeral or letter. For example, elements 121-1 and 121-N may be collectively referenced as 121. Elements shown in the various figures herein can be added, exchanged, and/or eliminated so as to provide a number of additional examples of the disclosure. In addition, the proportion and the relative scale of the elements provided in the figures are intended to illustrate the examples of the disclosure and should not be taken in a limiting sense.

FIG. 1 is a schematic diagram of a container management system 100 consistent with an example of the present disclosure. As illustrated in the example of FIG. 1, a container management system according to the present disclosure can be can include a master node 102, which is responsible for managing the container management system 100, and multiple worker nodes 104-1, ..., 104-N (hereinafter referred to collectively as worker nodes 104) within which the services of the container management system 100 are operating to run a requested application. Examples of such requested applications can include operations such as create deployment, delete deployment, update deployment, and so forth. While two worker nodes 104 are illustrated in FIG. 1 for brevity sake, it is understood that the container management system 100 may include more than two worker nodes 104 (e.g., such as N number of worker nodes 104) that are for a cluster of worker nodes 104.

The master node 102 can be the entry point of all administrative tasks for the container management system 100 and may be responsible for orchestrating one or more worker nodes 104, within which the services of the container management system 100 for generating an application are located. The master node 102 includes an API server 106 that provides both the internal and external interface access to the container management system via the master node 102. The API server 106 receives commands, known as representational state transfer (REST) commands, from a command line (CL) interface tool 108, such as a kubectl command line interface, for example. The REST commands provide a set of architectural constraints that, when applied as a whole, emphasize scalability of component interactions, generality of interfaces, independent deployment of components, and intermediary components. The API server 106 processes the REST command requests, validates the commands, and executes the logic within the commands.

The results of the REST commands processed by the API server 106 are stored in a storage component 110, such as an etcd storage component, for example, included within the master node 102. The storage component 110 reliably stores configuration data of the cluster of worker nodes 104, representing the state of the cluster (i.e., what nodes are available in the cluster, what pods should be running, which nodes should be they be running on, etc.). The storage component 110 is a distributed, key value storage mainly used for shared configuration and service directory. The storage component 110 provides storage for REST commands received by the API server 106 to perform create-update-and-delete (CRUD) operations as well as an interface to register watchers on specific nodes, thereby providing a reliable way to notify the rest of the container management system 100 about configuration changes within the container management system 100. For example, the shared information in the storage component 110 enables the API server 106 to notify the entire cluster of worker nodes 104 in the container management system 100 about configuration changes such as jobs being scheduled, created and deployed, pod/service details and state, name spaces and replication information, and so forth.

The master node 102 also includes a scheduler 112 and a controller manager 114. The scheduler 112 can be included in the master node 102 to deploy pods and services onto the worker nodes 104. The scheduler 112 includes information regarding available resources on the container management system 100, as well as resources utilized for the services to run. As a result, the scheduler 112 makes decisions on where to deploy a specific service. The controller manager 114 uses the API server 106 to monitor the shared state of the container management system 100. For example, the controller manager 114 can make corrective changes to the current state of the container management system 100 to change the current state to another state, re-create a failed pod or remove a pod. In addition, the master node 102 can include a DNS server 107, such as, for example, which schedules the DNS pod and services on the cluster of worker nodes 104 and configures the kubelets to instruct individual containers to use the DNS service's IP to resolve a DNS entry 109.

A number of pods 116-1, ..., 116-N (hereinafter referred to collectively as pods 116) are co-located in each of the worker nodes 104, and one or more containers 118-1, ..., 118-N (hereinafter referred to collectively as containers 118) reside within each of the pods 116. The containers 118 are co-located on the host machine (machine where containers are running, i.e., worker node), and can share resources. The pods 116, which are the basic scheduling unit in Kubernetes, add a higher level of abstraction by grouping containerized components that share resources, such as storage, Linux namespaces, cgroups, IP addresses, and so forth. Each of the pods 116 is assigned a unique IP address within the container management system 100, which allows applications to use ports without the risk of conflict. Each of the pods 116 can define a volume, such as a local disk directory or a network disk, and expose the volume to the containers 118 within the pods 116. The pods 116 may be managed manually through the API server 106, or the management of the pods 116 may be delegated to a controller.

The containers 118 store the running application along with the libraries and components or services to run the software needed to run an application. These components include files, environment variables, dependencies and libraries. The host operating system (operating system running on the node. i.e., container) constrains access of the containers 118 to a physical resource, such as CPU, storage and memory, so that a single container, such as container 118-1, cannot take up all of a host's physical resources. A guest host operating system, on the other hand, includes instructions installed on either a virtual machine or partitioned disk that describes an operating system that is different than the host operating system. Therefore, a host operating system is installed on a computer and interacts with underlying hardware, while a guest operating system is located on a virtual machine.

The pods 116 included in a single worker node 104 are created, destroyed and re-created, based on the state of the server and the service itself, and therefore may not be intended to continue to exist for a long period of time. Because of the relatively short lifespan of the pods 116, the IP address that they are served on may change, making the communication of the associated microservices difficult. Therefore, Kubernetes has introduced the concept of a service, which is an abstraction on top of a number of pods 116, typically using a proxy in order to be run on top of the services in order for other services to communicate via a virtual IP address. As a result, load balancing may be set up for numerous pods 116 so that the pods may be exposed via a service. The pods 116 can be recreated and have changes made to their corresponding IP protocol. Therefore, services are created having stable IP and DNS names which can be used by other pods to communicate with the pod 116. For example, consider an image-processing backend which is running with three replicas. Those replicas are fungible—that is, frontends do not care which backend they use. While the actual pods 116 that compose the backend set may change, the frontend clients may not be aware of those changes or may not keep track of a list of the backends. Each of the services within the containers 118 of the container management system 100 is assigned a domain name service (DNS) name that includes a name identifying the pod 116 within which the service resides, along with a portion of the DNS name that identifies the name of the service.

Each of the worker nodes 104 includes a node agent, such as a kubelet, for example, (e.g., worker node 104-1 includes node agent 120-1, hereinafter the node agents 120-1, . . . , 120-N are referred to collectively as node agents 120) and a proxy, such as a kube-proxy for example, (e.g., worker node 104-1 includes proxy 122-1, hereinafter the proxies 122-1, . . . , 122-N are referred to collectively as proxies 122)). A node agent 120 is in communication with the master node 102 and receives details for the configuration of the pods 116 from the API server 106. The node agent 120 uses the received details to ensure that the constructed containers 118 are operating as intended. In addition, the node agent 120 may also receive information about specific services from the storage 110 to obtain information related to services and to create details related to newly generated or created services.

Each of the proxies 122 function as a network proxy, or hub through which requests are transferred, and as a load balancer for a service on a single worker node 104 which acts as a reverse proxy and distributes network or application traffic across a number of servers. The load balancer is used to increase capacity (concurrent users) and reliability of operations and perform network routing for transmission control protocol (TCP) and user data protocol (UDP) packets. The proxies 122 are responsible for routing traffic to the appropriate container 118 in order to enable access to services based on an IP address and numbering of an incoming request for creating an application.

In this way, the resources of the worker nodes 104 may be combined together and identified so that when an application or program is to be created or deployed onto the container management system 100, the program or services for creating and running the application are located throughout the individual worker nodes 104. If any of the nodes 104 are added or removed, the container management system 100 is able to create or deploy the programs or services by combining resources from different nodes 104 or using a combination of different services within the nodes 104.

In order to deploy containerized applications in a containerized management system, such as a Kubernetes system, for example, a deployment configuration for providing instructions on how to create and update services for creating a desired application can be input to the master node 102 via a command line interface 108, such as a kubectl command line interface, for example. Once the instructions on how to create and update services for creating a desired application have been received by the master node 102, the API server 106 of the master node 102 schedules the application onto individual worker nodes 104 within the cluster of worker nodes 104 of the container management system 100 to create the application using a combination of multiple different services within multiple different containers 118 of multiple different pods 116 of the container management system 100. In this way, the application is created using a combination of services located in multiple containers 118 located within one or more pods 116 within one or more worker nodes 104.

Once the application has been created and scheduled, the master node 102 continuously monitors the pods 116. If the master node 102 determines that a service used for the application located within one of the containers 118 of the pods 116 goes down or is deleted, the master node 102 restarts the deleted or nonoperating service using services within the containers 118 of the pods 116 of the container management system 100. In this way, the API server 106 monitors the functionality of the pods 116, and when the pods 116 no longer functions as intended, may recreate the pod 116.

Each worker node 104 includes a hibernator deployment (e.g., worker node 104-1 includes a hibernator deployment 124-1, hereinafter the hibernator deployments 124-1, . . . , 124-N are referred to collectively as hibernator deployment 124). As described above, each of the containers 118 store the running application along with the libraries and components or services to run the software needed to run an operation for the application. When a user inputs a command via the CL interface 108, the command can include multiple semantics for instructions for running the application. For example, a semantic such as "hibernate-when-inactive" can be included in the configuration file forming the command by the user instructing that the application is to be hibernated or transferred to an inactive state when the application is not used for a specified period of time, such as ten (10) minutes for example.

The hibernator deployment 124 can monitor its corresponding applications on the corresponding cluster of worker nodes 104 of the container management system 100 and identify those applications that include the "hibernate-when-inactive" semantic defined for the application. The hibernator deployment 124 transfers the application to an inactive state when the hibernator deployment 124 determines both that the application includes the "hibernate-when-inactive" semantic and is not receiving data packets on the service port for the specified period of time, i.e., ten (10) minutes for example.

While the application is in the inactive state, the hibernator deployment 124 diverts traffic coming on the hibernated application's service port to the hibernator deployment 124. The hibernator deployment 124 monitors the service port on behalf of the hibernated application and when the hibernator deployment 124 receives an incoming packet on the hibernated application's port, the hibernator deployment caches the incoming packet or packets and transfers the hibernated application from the inactive state to an active state. Once the hibernated application is transferred from the inactive state to the active state, operation of the application resumes and the cached data packets are relayed to the application for resumed processing, as described below.

Figure 2:
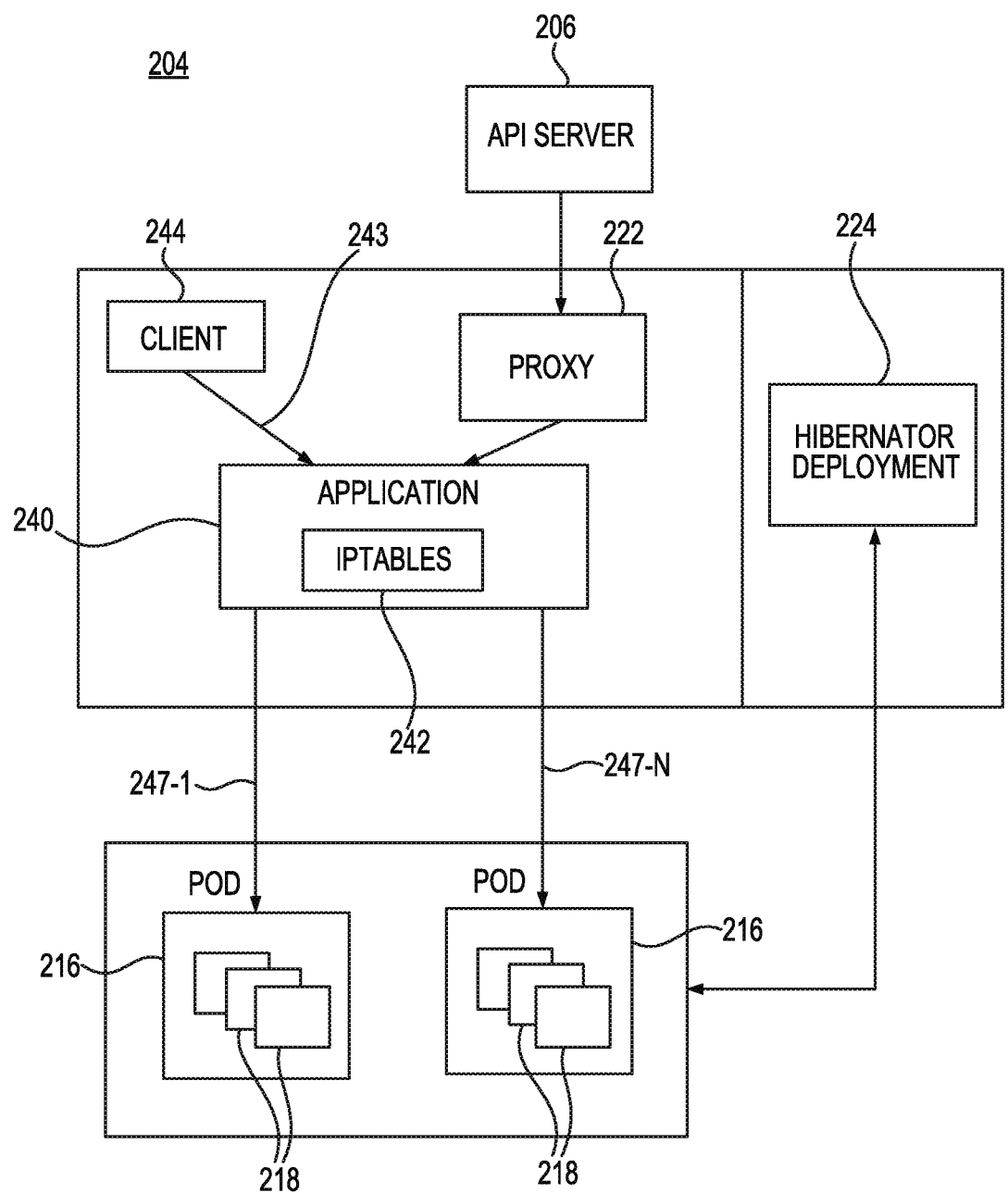
FIG. 2 is a schematic diagram of an example operation of a hibernator deployment of a container management system consistent with the present disclosure.

FIG. 2 is a schematic diagram of operation of a hibernator deployment 224 of a container management system 204 according to an example consistent with the present disclosure. When instructions on how to create and update services for creating a specific application are received by the master node via the command line interface, as described above, an API server 206 schedules an API service or application 240 on a worker node 204 using a combination of multiple different services that are located within multiple different containers 218 of multiple different pods 216 of a cluster of worker nodes 204. The application 240 is a grouping of pods 218 that are running on one or more of the worker nodes 204. Each application 240 includes a pod label query which defines the pods 218 having containers 216 containing services that will be utilized to process the application 240.

A proxy 222 on the worker node 204 routes traffic, indicated by multiple arrows 247-1, . . . , 247N (hereinafter referred to collectively as arrows 247) of FIG. 2, to the appropriate container or containers 218 within which services required for creating the application 240 are located so that a service endpoint of the application 240 for obtaining access to the containers 218 is identified based on an IP address of the associated pods 216. The proxy 222 updates iptables 242 for the application 240, through which the incoming and outgoing packet flow can be controlled, that include the IP addresses of the pods 216 used for capturing traffic to the services of the appropriate containers 218 and the numbering of incoming requests 243 from a client 244 for creating the application. Such updating of the iptables 242 by the proxy 222 enables access to services within the containers 218 within one or more pods 216 based on the IP address for the pod 216.

When a user inputs a command via the CL interface to create the application 240, the user may include an annotation within the command instructing that the application 240 is to be hibernated when the application 240 is not used for a specified period of time, such as ten (10) minutes. For example, a semantic such as "hibernate-when-inactive" can be included in the configuration file forming the command and can include a specified period of inactivity. A hibernator deployment 224 can periodically create a list of the applications 240 on the cluster of worker nodes 204 to be monitored for inactivity based on those applications 240 that the hibernator deployment 224 identifies as including the "hibernate-when-inactive" semantic. In this way, the hibernator deployment 224 subsequently monitors packet flow on service ports of the applications 240 included in the lists of applications 240 to be monitored for periods of inactivity. The hibernator deployment 224 can determine whether to transfer the monitored application 240 from an active state to an inactive state in response to both the semantic being determined to be present for the application 240, i.e., the application 240 being an application 240 included in the created list of applications 240 to be monitored for inactivity, and the application 240 being determined to be inactive for the period of time indicated within the "hibernate-when-inactive" semantic.

Figure 3A:
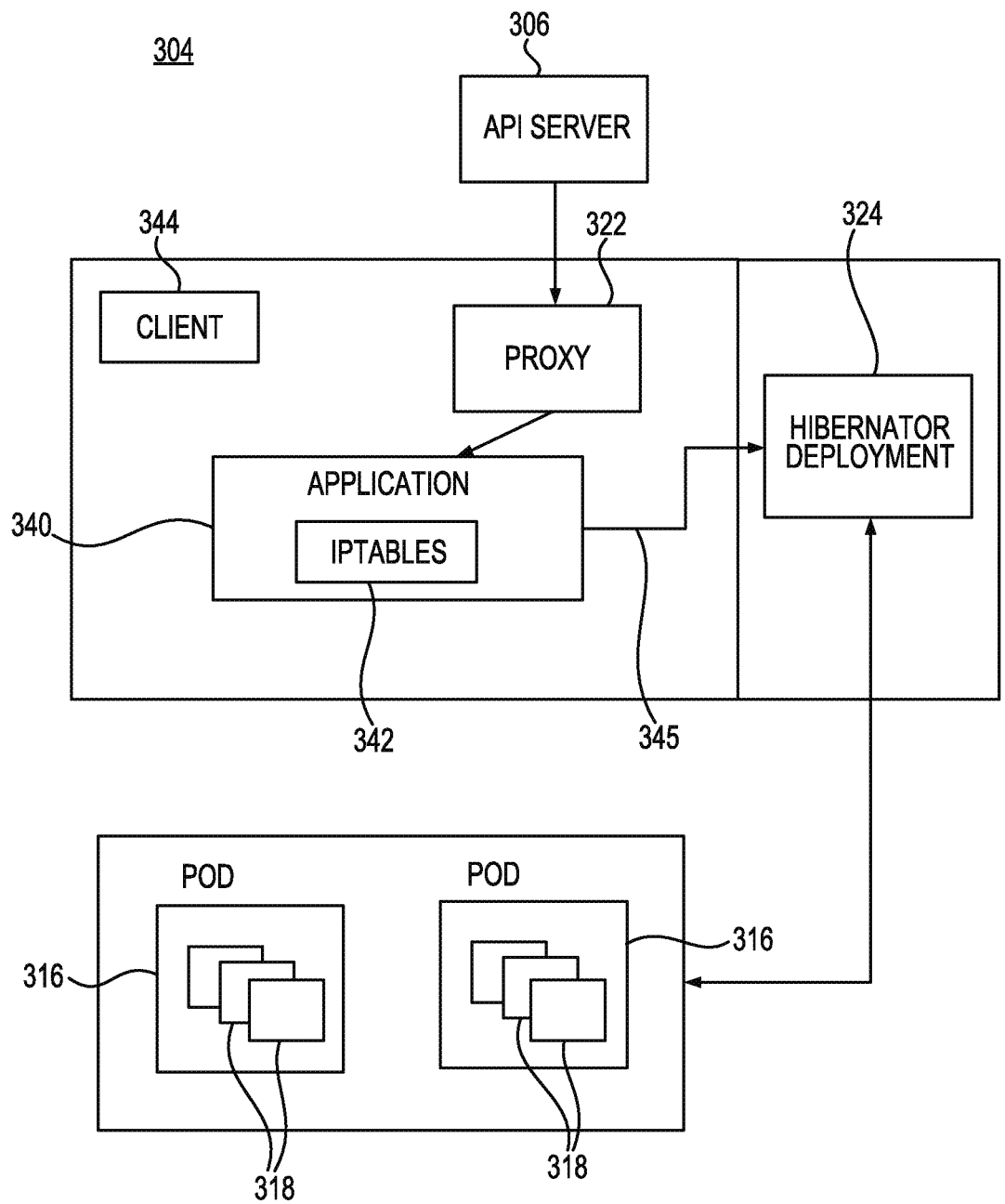
FIG. 3A is a schematic diagram of an example transfer of an application from an active state to an inactive state consistent with the present disclosure.

FIG. 3A is a schematic diagram 304 of transfer of an application from an active state to an inactive state according to an example consistent with the present disclosure. A hibernator deployment 324 can periodically (every 30 minutes, for example) monitor a current created list of the applications to be monitored for inactivity and when the hibernator deployment 324 determines, as indicated by the absence of arrow 343 extending from the client 344 to the application 340, that a request for the application 340 has not been received from the client 344 for the period of time of inactivity, i.e., ten (10) minutes, for example, indicated for the application 340 within the "hibernate-when-inactive" semantic, the hibernator deployment 324 can determine that the application 340 is to be hibernated. Therefore, the hibernator deployment 324 transfers the application 340 from the active state to an inactive state.

For example, in order to transfer the application 340 from the active state to an inactive state, the hibernator deployment 324 can scale down or reduce replica sets of the application 340 from a current value to zero to prevent the application 340 from running. Replica sets provide redundancy by providing multiple versions of an application so that problems may be prevented if one or more versions of the application fails. By having multiple replica sets or versions of a container enables traffic to more easily be sent to different instances or containers to prevent overloading of a single instance or pod. In the inactive state, a service policy can be changed by the hibernator deployment 324 in such a way that the service endpoint of the application 340 is transitioned by the hibernator deployment 324 from being located at the pods 316 associated with the application 340 to being located at the hibernator deployment 324, as indicated by the removal of arrows 247 shown in FIG. 2 and the addition of arrow 345 in FIG. 3A. As a result, any subsequent request received from the client 344 to access the application 340 while the application 340 is in the inactive state will terminate at the hibernator deployment 324 rather than at the pods 316 and can therefore be detected by the hibernator deployment 324.

In addition, packets from API interactions between the master node and the worker nodes related to the application 340 are transitioned to be received by the hibernator deployment 324 while in the application 340 is in the inactive state. The hibernator deployment 324 can then monitor the service port on behalf of the hibernated application 340 and when the hibernator deployment 324 receives an incoming packet for the application 340, such as an HTTP GET API (REST packet), the hibernator deployment 324 can then cache any incoming packet or packets for the application 340 in storage while the application 340 is in the inactive state.

In this way, by transferring the application 340 from the active state illustrated in FIG. 2 to an inactive state illustrated in FIG. 3A during inactive periods of non-use indicated by a lack of client requests to access the application, unnecessary consumption of resources (CPU, memory, etc.) of the cluster of worker nodes 304 by the application 340 can be reduced, resulting in a reduction in inefficient resource utilization and costs, along with an increase in system performance and a reduction of scaling issues for the cluster.

Figure 3B:
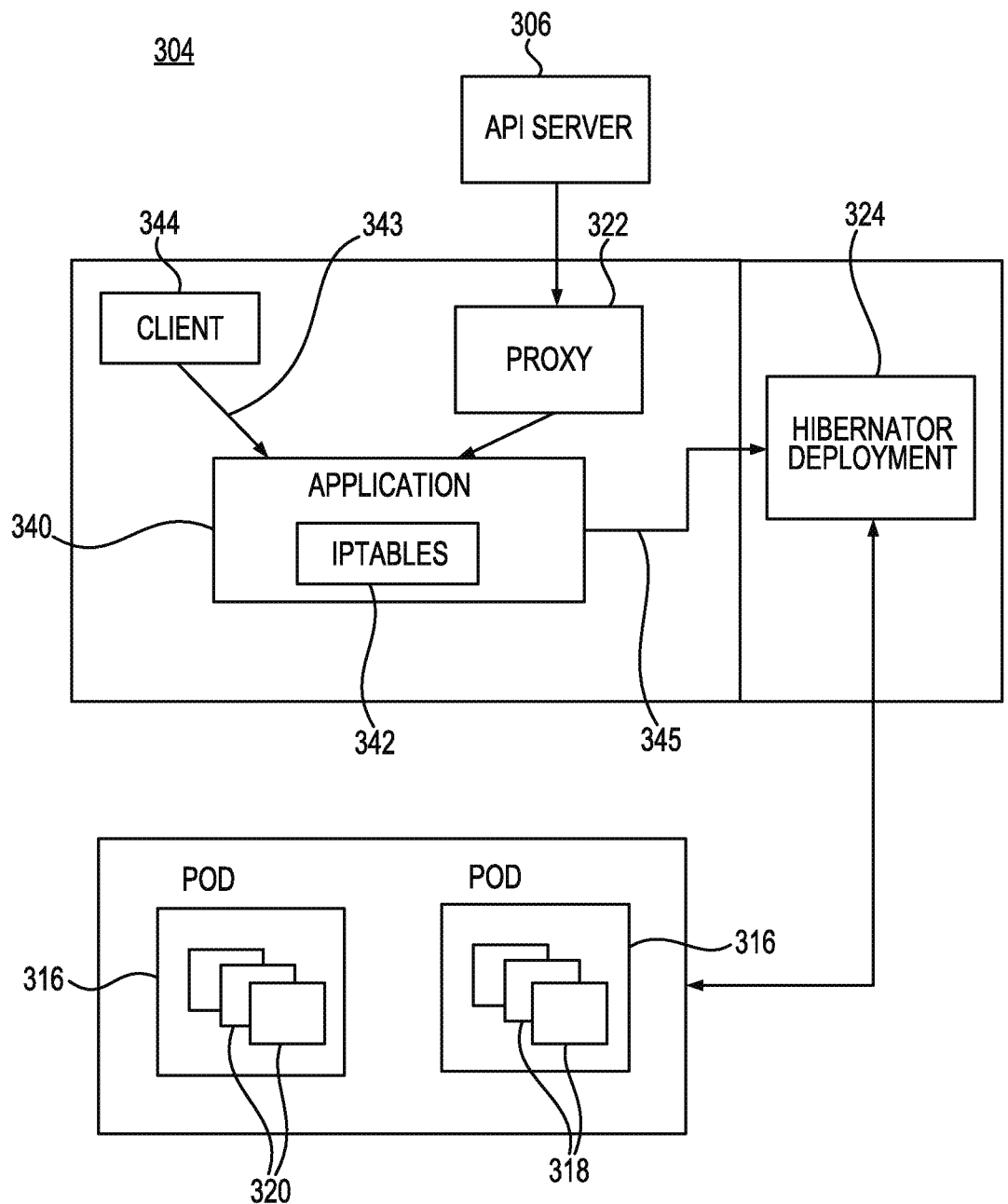
FIG. 3B is a schematic diagram of an example transfer of an application from an inactive state to an active state consistent with the present disclosure.

FIG. 3B is a schematic diagram 304 of transfer of an application from an inactive state to an active state according to an example consistent with the present disclosure. While the application 340 is in the inactive state and the hibernator deployment 324 determines that a subsequent request 343 is received from the client 344 to access the application 340, the hibernator deployment 324 determines that the application 340 is to be transferred from the inactive state illustrated in FIG. 3A to the active state illustrated in FIG. 2. For example, upon determining that a subsequent request 343 is received, as indicated in FIG. 3B, while the application 340 is in the inactive state illustrated in FIG. 3A, the service endpoint of the application 340 is transitioned by the hibernator deployment 324 from being located at the hibernator deployment 324 to being located at the pods 316 associated with the application 340.

In addition, the transition from the inactive state to the active state can include the hibernator deployment 324 transferring the packets that were stored by the hibernator deployment 324 while the application 340 was in the inactive state to the pods 316 for resumed processing of the application 340 at the pods 316. As a result, subsequent requests 343 received from the client 344 for accessing the application 340 will transition to being terminated at the pods 316 rather than at the hibernator deployment 324, and packets from API interactions between the master node and the worker nodes related to the application 340 will therefore resume to be received at the pods 316 once the application 340 is transferred from the inactive state, illustrated in FIG. 3A to the active state, illustrated in FIG. 2, by the hibernator deployment 324.

Figure 4:
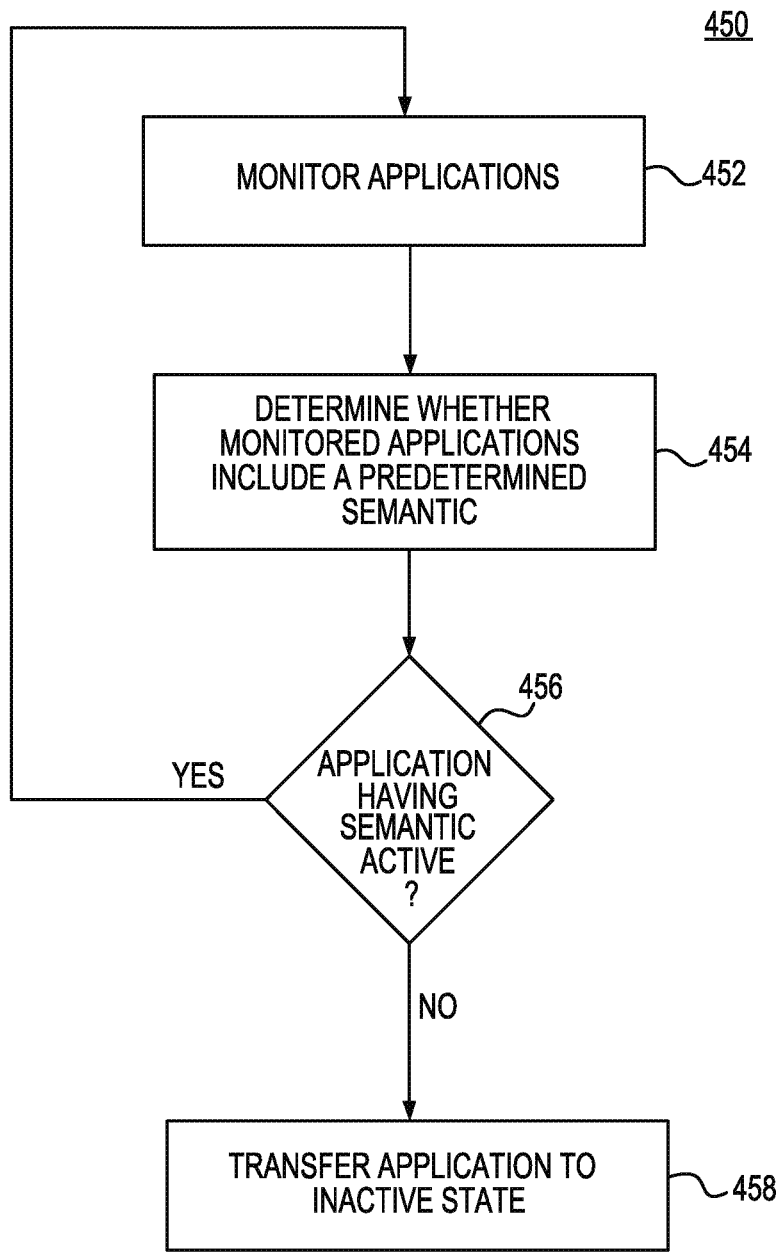
FIG. 4 is a flowchart of an example method of transfer of an application from an active state to an inactive state consistent with the present disclosure.

FIG. 4 is a flowchart of an example method 450 of transfer of an application from an active state to an inactive state consistent with the present disclosure. When a user inputs a command via the CL interface to create the application, the user may create the command to include an annotation instructing that the application is to be hibernated when the application is not used for a specified period of time, such as ten (10) minutes. For example, a semantic such as "hibernate-when-inactive" can be included in the configuration file forming the command and can include a specified period of inactivity after which it is requested that the application be hibernated, i.e., transferred from an active state to an inactive state. At 452, the method 450 can include periodically monitoring applications of the container management system, such as monitoring every 30 minutes, for example. At 454, the method 450 can include determining whether the monitored applications include a predetermined semantic. In one example, the predetermined semantic can be a "hibernate-when-inactive" semantic defined for the application indicating that the application should be transferred from an active state to an inactive state during periods when the application is inactive, such as when the application is inactive for 10 minutes, for example.

At 456, the method 450 can include determining whether an application having the predetermined semantic is active, indicated for example, by a request for accessing the application being received from a client within the indicated time period included within the semantic. For example, the application can be determined not to be active, i.e., inactive (No in 456), if no client requests for the application have been received during the predetermined time period defined in the semantic, such as 10 minutes for example. On the other hand, the application can be determined to be active (Yes in 456), if there has been one or more client requests for the application that have occurred during the predetermined time period.

If the application is determined to be active, the application continues to be in an active state and monitoring of applications continues at 452. At 458, the method 450 can include, in response to determining that the application is not active, the application is transferred from the active state to an inactive state. For example, in order to transfer the application from the active state to the inactive state, replica sets of the application can be scaled down to zero. In addition, a service policy change can be made so that a service endpoint of the application is transitioned from pods of worker nodes associated with the application to a hibernator deployment so that subsequent requests for the application while the application is in the inactive state will terminate at the hibernator deployment rather than at the pods of the worker nodes.

In one example, therefore, a method of transferring an application from the active state to an inactive state can include monitoring an application by a hibernator deployment of a container management system, determining a semantic defined for the application, and transferring the application from the active to the inactive state when the application is not active and based on the semantic defined for the application.

In this way, by transferring the application from the active state to the inactive state during inactive periods of non-use for the application, unnecessarily consume resources (CPU, memory, etc.) of the cluster of worker nodes by the application can be reduced, resulting in a reduction in inefficient resource utilization and costs, along with an increase in system performance and a reduction of scaling issues for the cluster.

Figure 5:
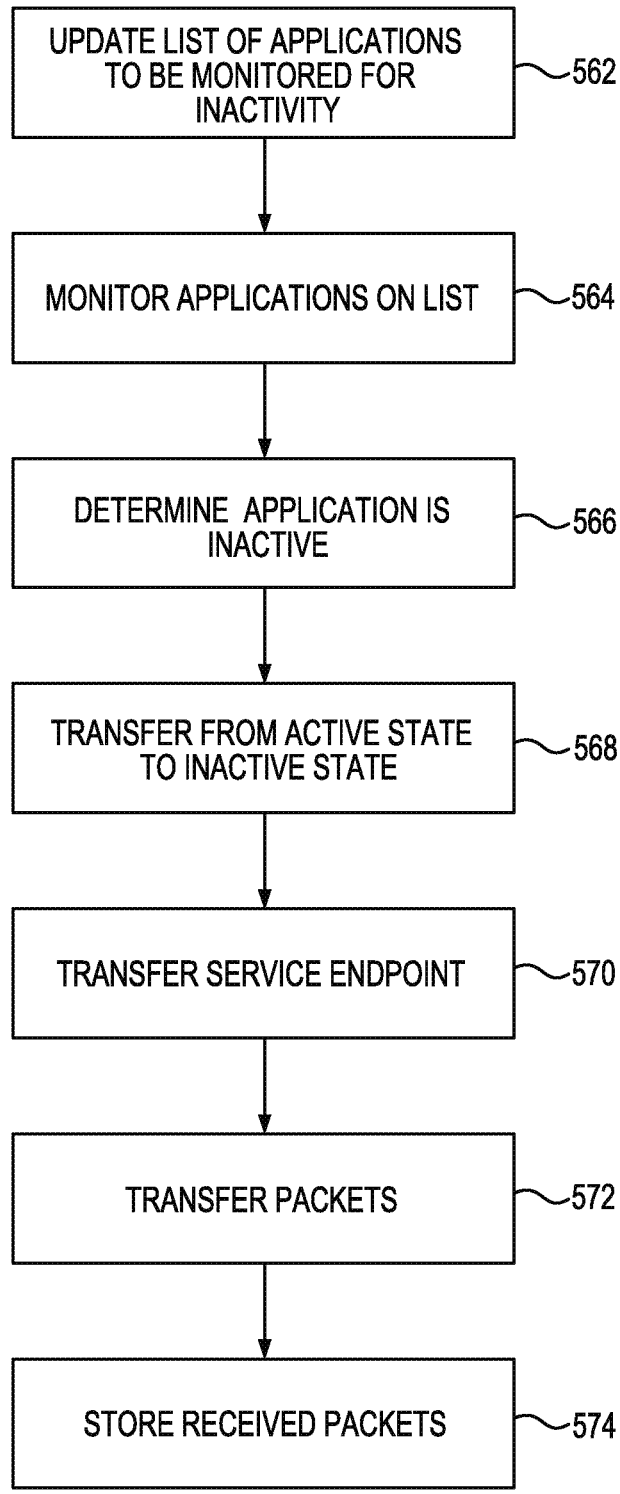
FIG. 5 is a flowchart of an example method of transfer of an application from an active state to an inactive state consistent with the present disclosure.

FIG. 5 is a flowchart of an example method 560 of transfer of an application from an active state to an inactive state according to an example consistent with the present disclosure. In some examples, the hibernator deployment may create a list of the applications on the cluster of worker nodes to be monitored for inactivity based on those applications that the hibernator deployment identifies as including the "hibernate-when-inactive" semantic. In this way, at 562, the method 560 can include periodically (e.g., every 30 minutes) updating, by the hibernator deployment, the list of applications to be monitored for inactivity. At 564, the method 560 can include, in response to the list being updated, subsequently monitoring, by the hibernator deployment, packet flow on service ports of the applications included on the list of applications to be monitored for periods of inactivity.

At 566, the method 560 can include determining, by the hibernator deployment, when applications on the list of applications are inactive. For example, the application may be determined to be inactive if there have been no client requests for the application received during a predetermined time period defined in the semantic, such as ten (10) minutes for example. On the other hand, the application may be determined to be active and therefore not to be inactive if one or more been client requests for the application have been received during the predetermined time period.

At 568, the method 560 can include determining, by the hibernator deployment, to transfer the application from the active state to the inactive state when the application is determined to be inactive. In order to transfer the application from the active state to the inactive state, the hibernator deployment can scale down or reduce replica sets of the application from a current value to zero. Replica sets provide redundancy by providing multiple versions of an application so that problems may be prevented if one or more versions of the application fails. By having multiple replica sets or versions of a container enables traffic to more easily be sent to different instances or containers to prevent overloading of a single instance or pod.

At 570, the method 560 can include changing, during transfer of the application from the active state to the inactive state, a service policy for the application by the hibernator deployment in such a way that the service endpoint of the application is transferred by the hibernator deployment from being located at the pods associated with the application to being located at the hibernator deployment. As a result, any subsequent request to access of the application that is received while the application is in the inactive state will terminate at the hibernator deployment rather than at the pods and will therefore be detected by the hibernator deployment.

At 572, the method 560 can include transitioning, by the hibernator deployment, packets from API interactions between the master node and the worker nodes related to the application to be transferred to the hibernator deployment rather than to the pods when the application is transferred to the inactive state. The hibernator deployment can then monitor the service port on behalf of the hibernated application and, at 574, when the hibernator deployment receives an incoming packet or packets for the application, the hibernator deployment can store the incoming packet or packets for the application while the application is in the inactive state.

Figure 6:
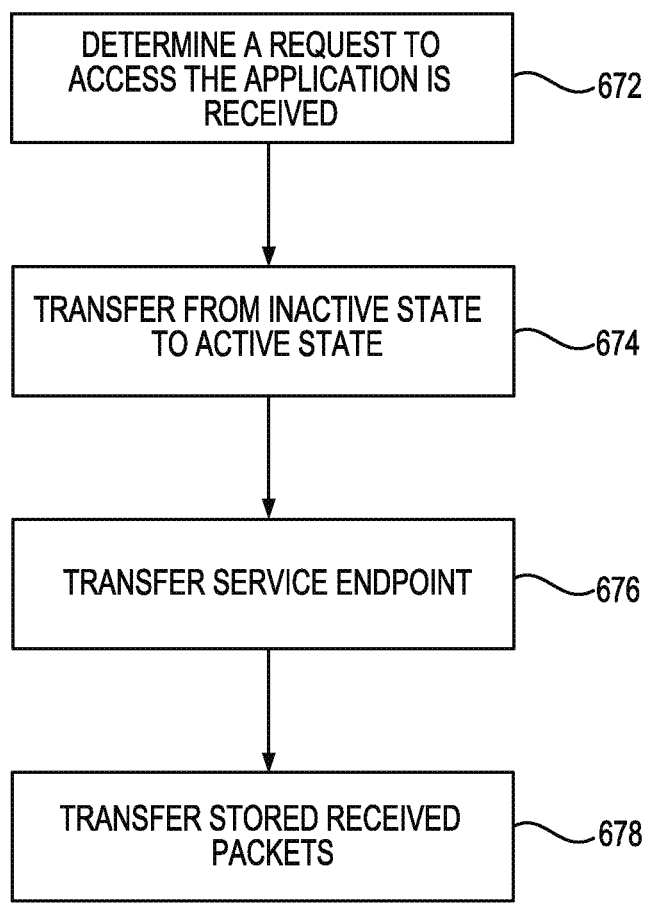
FIG. 6 is a flowchart of an example method of transfer of an application from an inactive state to an active state consistent with the present disclosure.

FIG. 6 is a flowchart of an example method 670 of transfer of an application from an inactive state to an active state consistent with the present disclosure. At 672, the method 670 can include, while the application is in the inactive state, the hibernator deployment monitoring the service port of the application and determining when a request to access the application is received at the service port. At 674, the method 670 can include, once a request to access the application has been received at the service port for the application by the hibernator deployment, the hibernator deployment transferring the application from the inactive state to the active state.

For example, in order to transfer the application from the inactive state to the active state at 674, the hibernator deployment can scale up replica sets of the application from the scaled down value used for transferring the application from the active state to the inactive state, i.e., zero for example, to their initial value utilized by the application when the application was in the active state. At 676, the method 670 can include the service endpoint of the application being transitioned by the hibernator deployment from being located at the hibernator deployment to being located at the pods of the worker nodes having containers that include services associated with performing the application.

At 678, the method 670 can include, during the transfer of the application from the inactive state to the active state the hibernator deployment transferring the packets that were stored by the hibernator deployment while the application 340 was in the inactive state to the pods utilized for creating the applications, i.e., pods of the worker nodes having containers that include services associated with performing the application. The transferred packets can then be utilized for resumed process of the application.

As a result, once the application is transferred from the inactive state to the active state, subsequent requests received for accessing the application will transition to being terminated at the pods of the worker nodes having containers that include services associated with performing the application rather than at the hibernator deployment. In addition, packets from API interactions between the master node and the worker nodes related to the application will therefore resume to be received at the pods of the worker nodes having containers that include services associated with performing the application once the application is transferred from the inactive state to the active state by the hibernator deployment.

In the foregoing detailed description of the present disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure and should not be taken in a limiting sense.

What is claimed is:

1. A container management system, comprising:
a plurality of worker nodes within which services of the container management system operate to perform an application; and
a hibernator deployment, wherein the hibernator deployment comprises a non-transitory computer readable medium comprising instructions executable to:
determine a semantic defined for the application, wherein the determined semantic comprises a hibernate-when-inactive semantic;
determine whether the application is active during a corresponding time period included within the semantic; and
transfer the application from an active state to an inactive state in response to the application not being active during the corresponding time period included within the semantic defined for the application; and
transition a service endpoint of the application from being terminated at the application to being terminated at the hibernator deployment in response to transferring the application from the active state to the inactive state.

2. The container management system of claim 1, wherein the non-transitory computer readable medium of the hibernator deployment comprises instructions executable to reduce replica sets for the application to zero in response to transferring the application from the active state to the inactive state.

3. The container management system of claim 1, wherein the non-transitory computer readable medium of the hibernator deployment comprises instructions executable to:
transition packets related to the application from being received at the application to being received at the hibernator deployment in response to transferring the application from the active state to the inactive state; and
store packets received at the hibernator deployment while the application is in the inactive state.

4. The container management system of claim 1, wherein the non-transitory computer readable medium of the hibernator deployment comprises instructions executable to:
determine, while the application is in the inactive state, whether a request to access the application is received; and
transfer the application from the inactive state to the active state in response to the request to access the application being received.

5. The container management system of claim 4, wherein the non-transitory computer readable medium of the hibernator deployment 4, comprises instructions executable to increase replicas sets for the application in response to transferring the application from the inactive state to the active state.

6. The container management system of claim 4, wherein the non-transitory computer readable medium of the hibernator deployment comprises instructions executable to transition a service endpoint of the application from being terminated at the hibernator deployment to be being terminated at the application in response to transferring the application from the inactive state to the active state.

7. The container management system of claim 4, wherein the non-transitory computer readable medium of the hibernator deployment comprises instructions executable to:
transition packets related to the application from being received at the hibernator deployment to being received at the application in response to transferring the application from the inactive state to the active state; and
download packets related to the application stored at the hibernator deployment while the application is in the inactive state to the application in response to transferring the application from the inactive state to the active state.

8. A device comprising:
a plurality of applications generated to perform deployments in a container management system; and
a hibernator deployment, wherein the hibernator deployment comprises a non-transitory computer readable medium comprising instructions executable to:
monitor the plurality of applications;
determine a semantic defined for the plurality of applications, wherein the determined semantic comprises a hibernate-when-inactive semantic;
determine whether an application of the plurality of applications is active during a corresponding time period included within the semantic; and
transfer the application from an active state to an inactive state in response to the application not being active during the corresponding time period included within the semantic defined for the application;
transition a service endpoint of the application from being terminated at the application to being terminated at the hibernator deployment in response to transferring the application from the active state to the inactive state.

9. The device of claim 8, wherein the non-transitory computer readable medium of the hibernator deployment comprises instructions executable to reduce replicas sets for the application to zero in response to transferring the application from the active state to the inactive state.

10. The device of claim 8, wherein the non-transitory computer readable medium of the hibernator deployment comprises instructions executable to:
transition packets related to the application from being received at the application to being received at the hibernator deployment in response to transferring the application from the active state to the inactive state; and
store packets received at the hibernator deployment while the application is in the inactive state.

11. The device of claim 8, wherein the non-transitory computer readable medium of the hibernator deployment is comprises instructions executable to:
determine, while the application is in the inactive state, whether a request to access the application is received; and
transfer the application from the inactive state to the active state in response to the request to access the application being received.

12. The device of claim 11, wherein the non-transitory medium of the hibernator deployment comprises instructions executable to increase replicas sets for the application in response to transferring the application from the inactive state to the active state.

13. The device of claim 11, wherein the non-transitory medium of the hibernator deployment comprises instructions executable to transition a service endpoint of the application from being terminated at the hibernator deployment to be being terminated at the application in response to transferring the application from the inactive state to the active state.

14. The device of claim 11, wherein the non-transitory medium of the hibernator deployment comprises instructions executable to:
transition packets related to the application from being received at the hibernator deployment to being received at the application in response to transferring the application from the inactive state to the active state; and
download packets related to the application stored at the hibernator deployment while the application is in the inactive state to the application in response to transferring the application from the inactive state to the active state.

15. A non-transitory computer readable medium having instructions for performing a method, the method comprising:
monitoring an application by a hibernator deployment of a container management system;
determining a semantic defined for the application, wherein the determined semantic comprises a hibernate-when-inactive semantic;
determining whether the application is active during a corresponding time period included within the semantic; and
transferring the application from an active state to an inactive state in response to the application not being active during the corresponding time period included within the semantic defined for the application;
transitioning a service endpoint of the application from being terminated at the application to being terminated at the hibernator deployment in response to transferring the application from the active state to the inactive state.

16. The non-transitory computer readable medium of claim 15, wherein the method further comprises:
storing incoming packets for the application in the hibernator deployment while the application is in the inactive state;
determining whether a request to access the application is received while the application is in the inactive state; and
transferring the application from the inactive state to the active state in response to the request being determined to be received.

17. The non-transitory computer readable medium of claim 16, wherein the method further comprises:
reducing replicas sets for the application in response to transferring the application from the active state to the inactive state; and
increasing the replica sets for the application in response to transferring the application from the inactive state to the active state.

18. The non-transitory computer readable medium of claim 16, wherein the method further comprises:
  transitioning the service endpoint of the application from being terminated at the hibernator deployment to be being terminated at the application in response to transferring the application from the inactive state to the active state.

* * * * *